United States Patent [19]

Cataldo

[11] 4,121,160

[45] Oct. 17, 1978

[54] SWITCH MEANS FOR RADIO ALARM DEVICE

[76] Inventor: Thomas R. Cataldo, 5169 Princess Ann Dr., La Canada, Calif. 91001

[21] Appl. No.: 780,011

[22] Filed: Mar. 22, 1977

[51] Int. Cl.² .............................................. H04B 1/034

[52] U.S. Cl. ...................................... 340/321; 325/16; 325/111; 325/118; 340/539; 340/573

[58] Field of Search ................. 325/118, 16, 361, 111, 325/117, 119, 161, 169, 356; 200/61.12, 83 N, 86 N, 16 A, 19 A, 30 A; 340/224, 276, 277, 283

[56] References Cited

U.S. PATENT DOCUMENTS

| | | | |
|---|---|---|---|
| 1,993,436 | 3/1935 | Eberhard | 325/118 |
| 2,367,441 | 11/1945 | Schwinn | 260/16 A |
| 2,665,342 | 1/1954 | Vadnais | 340/277 |
| 2,694,117 | 11/1954 | Bakke | 200/19 A |
| 2,810,068 | 10/1957 | Weisz et al. | 325/111 |
| 3,183,443 | 5/1965 | Lefevre | 325/118 |
| 3,209,089 | 9/1965 | Weissburg | 200/80 N |
| 3,668,528 | 6/1972 | Hutchinson et al. | 325/361 |

FOREIGN PATENT DOCUMENTS

| | | | |
|---|---|---|---|
| 1,071,587 | 6/1967 | United Kingdom | 325/361 |

*Primary Examiner*—Robert L. Griffin
*Assistant Examiner*—Tommy P. Chin
*Attorney, Agent, or Firm*—Lawrence Fleming

[57] ABSTRACT

In a miniature concealable radio alarm transmitter to be worn on the person, a switch means to activate the transmitter. The transmitter is preferably flat in shape, and includes a small battery which extends across the end of the circuit board. Two spring contact members extend adjacent each end of the battery, which has button-type terminals on its ends. A soft sponge elastomer spacer is fitted between each contact member and its end of the battery. The spacer has a central hole. Finger pressure against either spring member forces it toward the adjacent battery terminal to make contact therewith. To connect the battery to the circuit and energize the alarm transmitter, both spring members must be squeezed toward each other from opposite sides of the transmitter, making contact with each battery terminal. It is thus difficult to accidentally activate the transmitter. The switch means comprises two switches in series. The whole device is preferably cased in a bag-like enclosure of soft flexible material with a cord adapted to be hung around the wearer's neck.

4 Claims, 4 Drawing Figures

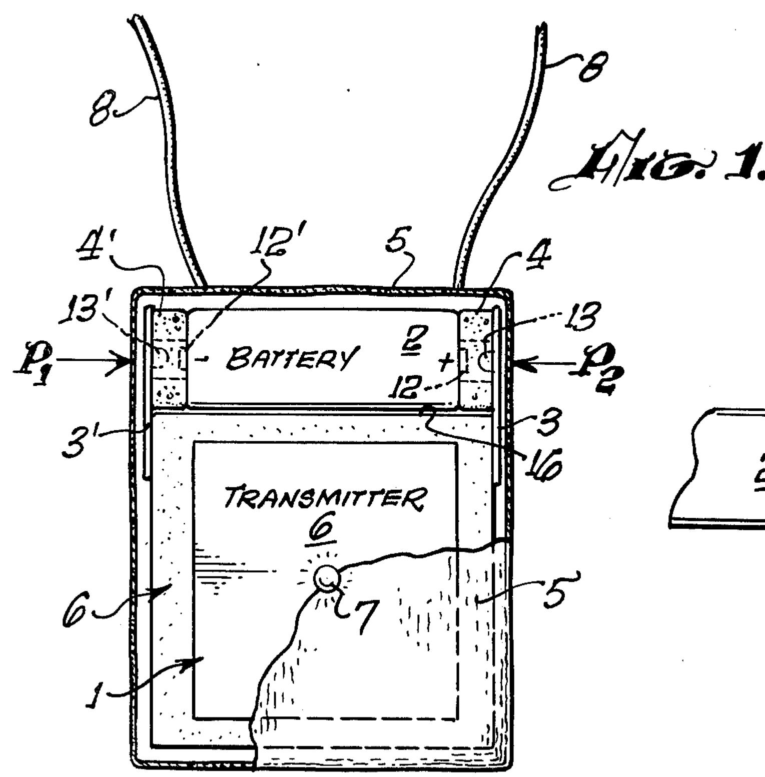
8
8
FIG. 1.
4'
12'
5
4
13'
13
P1
- BATTERY
2
+
P2
12
3'
3
16
TRANSMITTER
6
6
7
5
1
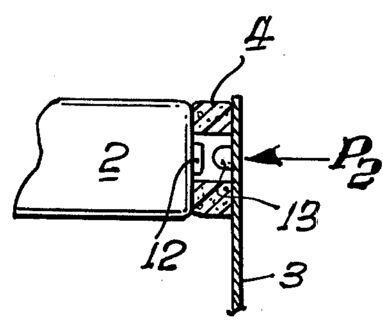
4
2
P2
13
12
3
FIG. 2.
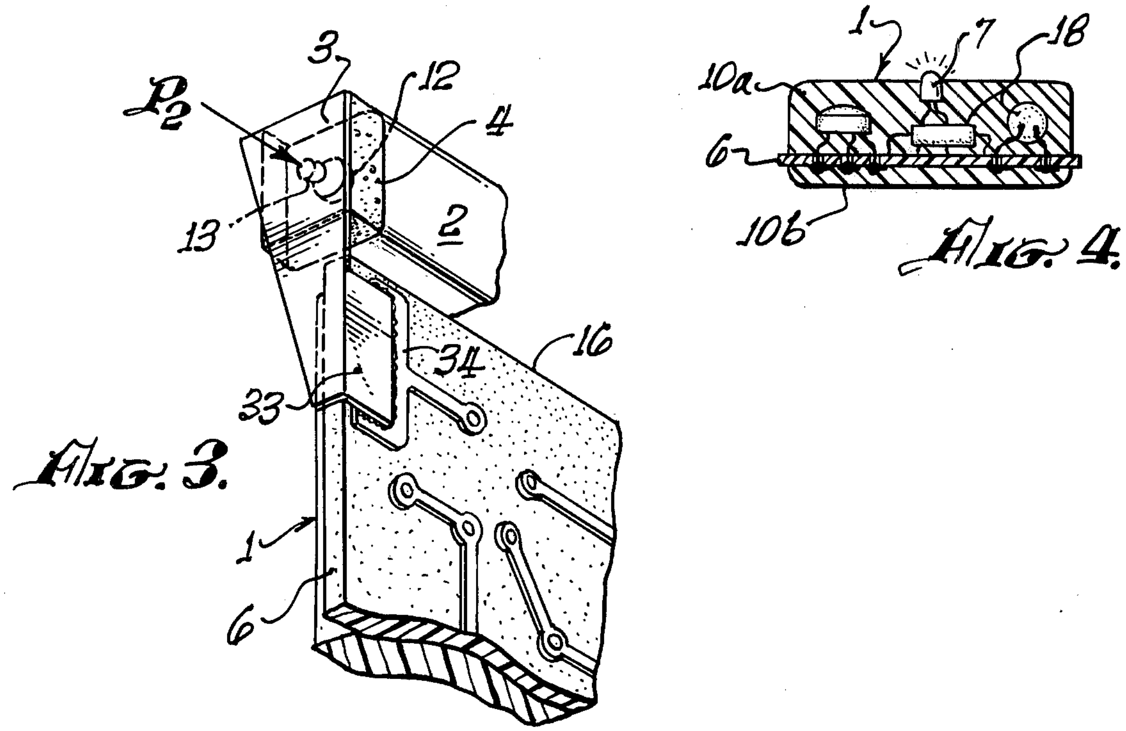
3
12
P2
4
13
2
16
34
33
FIG. 3.
1
6
1
7
18
10a
6
10b
FIG. 4.

SWITCH MEANS FOR RADIO ALARM DEVICE

BACKGROUND

Miniature radio transmitters worn on the person are known for the purpose of summoning police or medical aid in case of emergency. Such a transmitter may have a range of 100 or 200 m, and may form a part of a system that includes a receiver which is adapted to activate an alarm or a telephone dialing device.

The transmitter itself is preferably worn on the person, as by a neck strap or cord, and may be about the size of a paper match book or a cigarette lighter.

Ordinary switches are not suitable for activating such a transmitter. A toggle switch for example requires two hands, one to hold the transmitter and the other to flip the switch. Ordinary push-button switches are susceptible to false operation when the wearer leans against an object or, in the case of a cardiac patient, turns over in bed.

A switch means is needed which is operable with one hand, requires little space, cannot be operated by pressures incident to normal activities, and is operable silently in a concealed manner.

BRIEF SUMMARY

A complete concealable alarm transmitter according to this invention may preferably comprise a circuit board about 4 cm. square with a small stick-shaped battery extending across one end. A suitable battery is a type known as NEDA 220, which delivers 15 volts and is about 1.5 cm. in diameter by 3.3 cm. long, with button-type terminals at its opposite ends. The transmitter and battery are preferably enclosed in a soft bag-like case equipped with a cord for hanging around the neck.

Two pairs of switch contacts are provided in series, closed by squeezing against the narrow sides of the cased transmitter between thumb and finger. Preferably, these contacts are between each battery terminal and an adjacent flat spring or resilient member which is pressed against it. The spring members are preferably attached as by soldering to opposite corner portions of the circuit board. When the soft flexible case encloses the transmitter, these spring members lie directly under it, and may be squeezed through it to energize the transmitter.

Between the flat spring members and the battery terminals are fitted soft elastomeric insulating spacers. These may be of sponge or foam rubber of generally ring-like shape with holes in their centers to clear the contacts. They hold the contacts normally separated, and also serve to hold the battery itself in position so that other mounting means are not necessarily required. Finger and thumb pressure through the soft case against the spring members will overcome the elastic separating force of the spacers and cause the contacts to meet each other inside the holes.

The specific circuit of the transmitter itself does not form a part of this invention.

DETAILED DESCRIPTION

In the drawing:

FIG. 1 is a front view of a transmitter and switch means according to the invention, with the soft case shown in section;

FIG. 2 is a detail section view of one of the switch means;

FIG. 3 is a partial back perspective view of the circuit board and a spring member; and FIG. 4 is a partial sectional view of an encapsulated transmitter.

In FIG. 1 the transmitter 1 is shown in block form. It will be understood that in practice it is typically a suitable assembly of 15 or 20 electronic components on a printed circuit board 6 of known type.

The battery 2 preferably extends across the top edge 16 of the circuit board 2. It is supported by its ends through soft elastomeric spacers 4, 4', which in turn are held against the ends of the battery 2 by flat spring members 3, 3'. The whole assembly of transmitter 1 on board 6, and battery 2, may preferably be encased in a soft flexible bag-like case 5, which is shown in section. Case 5 may have a neck cord 8 attached to it, as shown. The transmitter 1 may be provided with an indicator lamp 7, normally a small light-emitting diode, which protrudes through a small hole in the case 5. The indicator lamp 7 is preferably connected so that it lights when the switching contact pairs are both closed and the battery 2 is operable.

Pressure against the points opposite the battery ends, as indicated by arrows $P_1$ and $P_2$, serves to close the contacts to the battery and energize the transmitter 1.

FIG. 2 shows a cross-section of one of the switching elements. The ends of battery 2 carry button-type terminals 12, 12'. Opposite these terminals are contact buttons 13, 13', which are soldered or otherwise fastened to the spring member 3. The terminal 12 and contact button 13 are held apart by the elastomeric spacer 4, which has an opening in the middle to clear them. The spacer 4 may be made of sponge or foam rubber or other material of similar physical properties. A suitable force $P_2$, FIG. 2, will press the contacts 12 and 13 together against the elastic separating force of the spacer 4. The construction at the other end of the battery, not shown in FIG. 2, is the same. Referring back to FIG. 1, both spring members 3 and 3' must be pressed toward each other by forces $P_1$ and $P_2$ for contact to be made at both ends of the battery 2 to energize the transmitter 1. It will not do, e.g., to hold the transmitter 1 in one hand and press with the other hand against only one side of the device, either at $P_1$ or at $P_2$.

It will be apparent that other spring-type switching means may be used within the purview of the invention, provided that they are dual in character and located at opposite points on the device.

FIG. 3 shows a preferred detailed construction for the spring members 3, 3'. Only member 3 is shown. It may be made of spring bronze or the like about 0.1 mm. thick. The side portion extends perpendicular to the plane of the board 6 as shown. A bent-under portion 33 is provided which is fastened, as by soldering, to a suitable conductor 34 on the back side of the circuit board 6. The second spring member 3', not shown in FIG. 3, may be made and mounted in the same manner.

Referring to FIG. 4, a cross-section is shown of a modification in which the circuit board 6 and the transmitter 1 are encapsulated or potted in a suitable material. The top encapsulation is indicated at **10*a*, enclosing and waterproofing the electronic components such as are indicated at 18. The back or bottom side of the circuit board 6 may also be encapsulated or coated as at 10*b***.

It will be noted that the battery 2 and its associated holding and contact and switching means 3, 4 are not part of the circuit board. The flat spring members 3, 3' protrude off the top edge 16 of the board 6.

The spacers 4, 4' may be made of cellular foam-like material which liquids will not flow through, and be cemented both to the spring members 3 and to the ends of the battery 2, making a waterproof assembly. In addition, the soft flexible case 5 may be sealed against the entry of water so that, for example, the whole device may be worn in a bathroom shower. Such encapsulation and sealing is not feasible with conventional switches which use, for example, internal slide or toggle mechanisms, since such a switch would have to be mounted on the circuit board 6. In addition, the switching and battery-support means of the invention has been found to permit a substantial reduction in size and weight of the complete device, so that it can be worn comfortably under the clothing.

I claim:

1. In a miniature alarm transmitter device adapted to be worn on the body of a person under the clothing:

a battery, and a miniature radio transmitter built on a circuit board, said battery having a terminal at each of its opposite ends and extending generally parallel to one side portion of said board;

a pair of resilient metal spring contact and support members each secured to said side portion adjacent one of said terminals and having a contact portion extending generally outward opposite to one of said terminals;

a pair of ring-like resilient insulating spacers each positioned between each said contact portion and its adjacent said terminal, said spacers electrically separating both said contact portions and terminals and also supporting said battery by its said terminals from said members, and an outer housing in the form of a soft flexible bag enclosing both said battery and transmitter, whereby squeezing pressure through said outer housing simultaneously against both said support members toward each other is adapted to press both said contacts against their respective battery terminals to activate said transmitter.

2. A device as in claim 1 wherein each said spacer is of cellular elastomeric material impervious to water.

3. A device as in claim 2, further comprising:

a waterproof encapsulant encasing said transmitter inside said outer housing, and waterproof cement between each said spacer and its adjacent said member and said terminal.

4. A device as in claim 2, further comprising:

a neck strap secured to said outer housing, said device being wearable around the neck under the clothing and energizable by squeezing against opposite sides of said device.

* * * * *